United States Patent Office 2,829,143
Patented Apr. 1, 1958

2,829,143

2 - (4 - SULFAMYLPHENYLAMINO) - 4 - AMINO TRIAZINE AND ACID ADDITION SALTS

Royal A. Cutler, West Sand Lake, and Samuel Schalit, Albany, N. Y., assignors to Sterling Drug Inc., New York, N. Y., a corporation of Delaware No Drawing. Application March 13, 1957
Serial No. 645,677

5 Claims. (Cl. 260—239.65)

This invention relates to 2-substituted - 4 - amino-1,3,5-triazines.

The present invention resides in the concept of a composition of matter having a molecular structure wherein a sulfamyl radical, $H_2NSO_2$—, is attached at the 4-position on the phenyl ring of a 2-phenylamino-4-amino-1,3,5-trazine; the acid-addition salts of such composition; and, a process for preparing the compositions.

The physical embodiments of the inventive concept have been evaluated by standard pharmacological testing procedures and demonstrated to possess diuretic properties in living animals.

The embodiment of the inventive concept in tangible form can be accomplished by cyclizing 4-sulfamylphenylbiguanide with formic acid, preferably at elevated temperatures, to produce a 2-(4-sulfamylphenylamino)-4-amino-1,3,5-triazine formate, which salt is then dissociated, as by hydrolysis with water or aqueous alkali, to generate the free base.

Both by intravenous and oral routes our new compounds have a high degree of diuretic activity in the animal organism which persists for a relatively long period of time and also have a relatively low toxicity. By virtue of these advantageous properties the compounds of our invention are useful as non-mercurial diuretic agents and are particularly valuable in being orally effective diuretic agents for increasing urinary elimination of sodium and chloride ions and water in the treatment of conditions in which such effects are desirable.

In a convenient and advantageous manner of carrying out the cyclization process of our invention, the number of equivalents of formic acid used is in excess over the number of equivalents of 4-sulfamylphenylbiguanide. To ensure best yields, based on conversion of the 4-sulfamylphenylbiguanide, we prefer to employ an amount of the formic acid reactant in considerable excess over the two equivalents needed to convert all of each equivalent of the 4 - sulfamylphenylbiguanide to 2 - (4 - sulfamylphenylamino)-4-amino-1,3,5-triazine formate. The excess formic acid serves conveniently as a solvent and reaction medium. Instead of using formic acid itself, equivalently there can be employed a suitable formic acid ester, such as a lower alkyl formate; for example, an alcoholic solution of ethyl formate can be used. As will be readily appreciated, the 4-sulfamylphenylbiguanide reactant can be used in the form of its formate salt instead of using the free base form.

The rate of the cyclization reaction is increased by application of heat and thus it is ordinarily preferred to warm or heat the reaction mixture. We have found that it is generally most convenient to heat the reactants in an excess of formic acid under reflux for several hours. A considerable portion of the excess formic acid in the mixture is then readily removed by distillation under reduced pressure. The residual mixture can either be cooled to cause separation of 2-(4-sulfamylphenylamino)-1,3,5-triazine formate or else is diluted directly with water.

The latter procedure causes substantially complete dissociation of the formate salt, generating the sparingly soluble 2-(4-sulfamylphenylamino) - 4 - amino - 1,3,5-triazine which readily separates from the dilute formic acid solution in good yield. If desired, instead of diluting the solution of the formate with water alone, there can be used an aqueous solution containing sufficient alkali to neutralize all of the formic acid released by dissociation of the formate salt. However, the use of alkali to dissociate the formate is not necessary and has been found ordinarily to afford no particular advantage.

A convenient method for the conversion of the 3-(4-sulfamylphenylamino) - 4-amino-1,3,5-triazine to a salt with an organic or inorganic acid is to dissolve an appropriate quantity of the base in a concentrated solution of the acid and cool the acidic solution until the desired acid-addition salt separates from the solution. Generally speaking, these acid-addition salts, for example the hydrochloride, hydrobromide, sulfate, formate, acetate, p-toluenesulfonate, etc., are sparingly soluble in water. They are readily dissociated, as above-noted by neutralization, or by dilution of aqueous solutions, to generate the free base, 2-(4-sulfamylphenylamino)-4-amino-1,3,5-triazine. The acid addition salts are thus all useful as sources of the free base form even if the particular salt per se is not desired as the final product, as when the salt is formed only for purposes of purification. In addition, the acid-addition salts of 2-(4-sulfamylphenylamino)-4-amino-1,3,5-triazine with pharmaceutically acceptable organic and inorganic acids, that is, acids the anions of which do not contribute substantially to the toxicity of the acid-addition salt, are quivalent to the free base form as diuretic agents and can if desired be used instead of the base.

The 4-sulfamylphenylbiguanide employed as a starting material in the process of our invention is readily obtained; for example it can be prepared by interacting sulfanilamide, hydrochloric acid, and dicyanodiamide to yield 4-sulfamylphenylbiguanide hydrochloride which by treatment with alkali is converted to the desired free base.

Our invention is illustrated by the following example without, however, being restricted thereto.

EXAMPLE (A) *4-sulfamylphenylbiguanide.*—399 g. of sulfanilamide was dissolved in a solution of 193 ml. of concentrated (about 38 percent) hydrochloric acid in 965 ml of water. To the resulting solution there was added 195 g. of dicyanodiamide. The solid rapidly dissolved when the mixture was warmed, yielding an amber solution which was then refluxed for six hours. The reaction mixture was chilled overnight (about fifteen hours) in a refrigerator and was then filtered to free it of a small amount of solid, which consisted largely of sulfanilamide. The filtrate was heated under reduced pressure to distill off most of the water it contained. To the thick liquid residue there was added 1.5 liters of anhydrous ethanol and the mixture was boiled. The white solid which had separated from solution was collected on a filter while the mixture was still hot. The product thus collected, which was 4-sulfamylphenylbiguanide hydrochloride, weighed 148 g. and melted at 216–220° C. By evaporating part of the ethanol from the filtrate, chilling, and filtering there was obtained a second crop of the same product which weighed 108.8 g. and melted at 213–217° C. Repetition of the recovery procedure on the filtrate from this second crop yielded a third crop of the product which weighed 59.7 g. and melted at 210–214° C.

148.8 g. of 4-sulfamylphenylbiguanide hydrochloride, M. P. 216–220° C., was dissolved in 600 ml. of boiling water acidulated by addition of one ml. of concentrated hydrochloric acid. The boiling solution was treated with charcoal and filtered. The filtrate was cooled to about 30° C. and 41 ml. of 35% aqueous sodium hydroxide solution was added. The mixture was stirred and chilled, and then filtered to collect 116 g. of white solid. This product, which melted at 194–197° C. with evolution of gas, was 4-sulfamylphenylbiguanide, having the structural formula

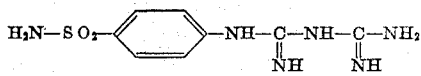

(B) *2-(4-sulfamylphenylamino) - 4-amino - 1,3,5-triazine.*—96 g. of 4-sulfamylphenylbiguanide prepared as described above was dissolved in 610 ml. of 90 percent formic acid and the solution was refluxed for three hours. There was thus produced 2-(4-sulfamylphenylamino)-4-amino-1,3,5-triazine formate. This salt can be isolated and dissociated, or the reaction mixture can be treated without isolation to generate the free base as follows: The reaction mixture was filtered, and the filtrate was distilled under reduced pressure to reduce its volume to about 305 ml. and then poured immediately into 700 ml. of cold water. The mixture was stirred and chilled in an ice bath and then filtered. The white solid thus collected, which was the desired free base, was washed with cold water and sucked partially dry on the filter. The solid was stirred well in 5 percent aqueous sodium bicarbonate solution to ensure removal of residual formic acid and then collected again on a filter. The product thus obtained, which weighed 56 g. and melted at 283–284° C., was established by its analysis, physical and chemical properties and method of synthesis to be 2-(4-sulfamylphenylamino)-4-amino-1,3,5-triazine, having the structural Formula I as set forth hereinabove.

*Analysis.*—Calculated for $C_9H_{10}N_6O_2S$: carbon, 40.58%; hydrogen, 3.79%; sulfur, 12.04%. Found: carbon, 40.77%; hydrogen, 4.00%; sulfur, 11.95%.

The solubility (weight/volume) of this compound in water was less than 0.25 percent; in hydrochloric acid, less than 0.25 percent; in 95 percent ethanol, less than 1 percent; and in 10 percent aqueous citric acid solution, less than 1 percent.

The 2 - (4-sulfamylphenylamino) - 4 - amino - 1,3,5-triazine was converted to the hydrochloride as follows. 0.5 g. of the base was dissolved at room temperature (about 26° C.) in 10 ml. of 10 percent hydrochloric acid. This solution was heated to about 90–95° C., filtered, and the filtrate was allowed to stand at room temperature overnight. The solution was then filtered to collect 0.37 g. of 2-(4-sulfamylphenylamino-1,3,5-triazine hydrochloride, a white solid which melted at 283–288° C. Treatment of the hydrochloride in aqueous suspension with an equivalent amount of sodium hydroxide in aqueous solution regenerated the free organic base.

*Diuretic activity.*—For use as oral diuretic agents, our new compounds are ordinarily most conveniently administered in the form of tablets or aqueous dispersions. These formulations are readily compounded in conventional fashion using an appropriate amount of the 2-(4-sulfamylphenylamino)-4-amino-1,3,5-triazine, or acid-addition salt thereof with an appropriate acid, such as hydrochloric acid, and the ordinary pharmaceutical excipients for the dosage form to be prepared. Thus, in a representative 200 mg. tablet, for example, the amount of 2-(4-sulfamylphenylamino) - 4 - amino-1,3,5-triazine or acid-addition salt thereof can be about 100 mg., the remainder being the usual tablet excipients such as starch, lactose, magnesium stearate, and dicalcium phosphate. In an aqueous dispersion containing an appropriate suspending agent, such as gum tragacanth, the concentration of the diuretic agent can be, for example, about 20–100 mg. per ml.

The diuretic activity of 2-(4-sulfamylphenylamino)-4-amino-1,3,5-triazine was determined by standard pharmacological procedure as follows: Female mongrel dogs were used as test animals with theophylline hydrochloride as a reference standard. The test animals were catheterized and suspended comfortably in canvas slings for the seven hour period of observation employed. The urine was collected in a graduated cylinder and each sixty-minute period was a control period, following which the test drug was administered by stomach tube as a suspension in 50 ml. of 5 percent aqueous gum tragacanth solution followed by 25 ml. of 0.85 percent aqueous sodium chloride solution. The data thus obtained, which are set forth in Table I below, indicated that 2-(4-sulfamylphenylamino)-4-amino-1,3,5-triazine was somewhat superior to theophylline at doses of 30 mg./kg. or less.

*Table I.— Comparative diuretic activity of 2-(4-sulfamylphenylamino)-4-amino-1,3,5-triazine (compound I) and theophylline hydrochloride in dogs*

| Dose (oral), mg./kg. | Mean total urinary excretion (6 hours) | | | |
|---|---|---|---|---|
| | Urine, volume, ml. | | Chloride, mg. | |
| | Compound I | Theophylline hydrochloride | Compound I | Theophylline hydrochloride |
| 7.5 | (2) 50 | (6) 14.3 | 295.6 | 427.8 |
| 15.0 | (3) 113.2 | (6) 52.7 | 533.9 | 469.4 |
| 30.0 | (3) 158.8 | (7) 79.3 | 1,259.5 | 1,026.7 |
| 60.0 | (4) 199.4 | (6) 95.2 | 1,441.0 | 1,587.9 |

The numbers in parentheses above refer to the number of dogs tested.

Further tests were carried out using a procedure similar to that described above, but utilizing at dose levels of 7.5, 15, 30, and 60 mg./kg. ten to seventeen beagle hounds per dose level; these dogs weighed 10 to 13 kg. each. The results of these tests showed that neither 2-(4-sulfamylphenylamino)-4-amino-1,3,5-triazine nor theophylline showed significant diuretic activity after single oral doses of 7.5 mg./kg. Theophylline manifested its maximum rate of diuresis about one hour after medication, with a progressive decrease thereafter. In contrast therewith, the onset of diuresis following oral administration of 2-(4-sulfamylphenylamino)-4-amino-1,3,5-triazine was more gradual and became maximum five to six hours after medication at the 30 and 60 mg./kg. dose levels. At 15 mg./kg., 2-(4-sulfamylphenylamino)-4-amino-1,3,5-triazine produced its maximum diuretic effect in one hour and the action was sustained over the following five hours of observation. At the sixth hour, the rate of urine excretion produced by 2-(4-sulfamylphenylamino)-4-amino-1,3,5-triazine at 15 mg./kg. was more than twice that of the same dose of theophylline and about one-third greater than that produced by theophylline at 30 mg./kg. With respect to increase of urine volume, 2-(4-sulfamylphenylamino)-4-amino-1,3,5-triazine was more effective than theophylline at all doses tested. The increase in chloride excretion was approximately the same for the two drugs at 15 mg./kg. At 30 and 60 mg./kg. 2-(4-sulfamylphenylamino)-4-amino - 1,3,5 - triazine produced significant increases in excretion of chlorides which was related to increase in dose. At the latter two dose levels, theophylline caused somewhat greater chloruresis but also showed more evidence of gastric irritation.

The diuretic effects of 2-(4-sulfamylphenylamino)-4-amino-1,3,5-triazine and theophylline were also compared in dogs using a different procedure. Mongrel dogs, weighing from 7.4 to 12.9 kg. each, were maintained in metabolism cages but were trained to consume their diet within a period of one hour outside the cage to reduce contamination of the urine. The diet consisted of a mixture of horse meat and pelleted dog chow, given once daily. Water was provided ad libitum in non-spilling containers. Twenty-four hour urine specimens were collected in cylinders, the volume recorded, and the sodium ion concentration in millimoles determined by interval standard flame photometry. Two cross-over types of experiments were performed using groups of 3 dogs for each dose level. The control values were obtained by averaging the values obtained during three control days preceding each meditation, and there was an interval of at least seven days between medication. The experimental data recorded were those obtained for the 24-hour period following drug administration. Both 2-(4-sulfamylphenylamino)-4-amino-1,3,5-triazine and theophylline were administered by stomach tube as a suspension in gum tragacanth. The two experiments, in which different dogs were used, yielded essentially identical results. In both tests each dog received each dose level of both drugs two times. The results of the second experiment are summarized in Table II below. For purposes of analysis of variance, all twenty-four control values were consolidated, as were the data for all twelve observations made at each dose level, namely 7.5, 15 and 30 mg./kg.

Table II.—Comparative diuretic activity of 2-(4-sulfamylphenylamino)-4-amino-1,3,5-triazine (compound I) and theophylline hydrochloride in dogs

DUPLICATE CROSS-OVER EXPERIMENT [1]

[Control period observations=36. Observations for each dose level=12.]

AVERAGE EXCRETION VALUE PER KG. PER 24 HOURS

| Dose, mg./kg. | Urine volume (ml.) | | | |
|---|---|---|---|---|
| | Compound I | | Theophylline hydrochloride | |
| | ml. | %  incr. | ml. | % incr. |
| Control | 38.8 ± 3 | | 38.8 ± 3 | |
| 7.5 | 48.8 ± 2.4 | 26 | 46 ± 4.7 | 17 |
| 15.0 | 67.0 ± 6.0 | 72 | 52.8 ± 3.7 | 36 |
| 30.0 | 108.6 ±14 | 180 | 81.5 ±15 | 110 |

| | Sodium (mM.) | | | |
|---|---|---|---|---|
| | Compound I | | Theophylline hydrochloride | |
| | mM. | % incr. | mM. | % incr. |
| Control | 3.4 ± 3 | | 3.4 ± 3 | |
| 7.5 | 3.98± .45 | 16 | 3.36± .87 | 0 |
| 15.0 | 6.0 ± 1.0 | 75 | 4.17± .52 | 71 |
| 30.0 | 6.35± 0.5 | 84 | 7.56± .68 | 119 |

[1] Each of 3 dogs received each dose level of each drug on 2 occasions with 7 days' interval between drug administrations. Drug given by stomach tube. Water was available ad libitum.

As shown in Table II, 2-(4-sulfamylphenyl)-4-amino-1,3,5-triazine was consistently more effective than theophylline in increasing water excretion. At 15 mg./kg., 2-(4-sulfamylphenylamino)-4-amino-1,3,5-triazine was superior to theophylline in increasing sodium excretion but at 60 mg./kg. theophylline was slightly more effective.

When infused intravenously in 5.0 cc. of propylene glycol and 35.0 ml. of 3% glucose at the rate of 4.0 cc. per minute, a test dose of 10 mg./kg. of 2-(4-sulfamylphenylamino)-4-amino-1,3,5-triazine was well tolerated by anesthetized dogs. The fall in blood pressure was minimal and recovery to normal levels was complete within five minutes after completion of the injection. The infusion increased urine flow by 100 to 200 percent for about one hour. Glomerular filtration rate (creatinine clearance) was increased in about half of the trials and essentially unchanged in the others. Plasma flow changes paralleled glomerular filtration rate response. Sodium excretion was increased as much as ten-fold; potassium excretion was usually increased; and chloride excretion and phosphate excretion were increased. Excretion of urinary bicarbonate occurred in all instances and was accompanied by increase in urinary pH and a decrease of titratable acid. The increased bicarbonate excretion was greatest in lightly anesthetized dogs which showed increased respiration rate, hence part of the increase in bicarbonate excretion may have been secondary to respiratory alkalosis.

Oral administration of 2-(4-sulfamylphenylamino)-4-amino-1,3,5-triazine in daily doses of 30 and 60 mg./kg. to six rhesus monkeys (*Macacus mulatta*) at each dose level for three weeks (18 doses in twenty-one days) gave the following results: control monkeys excreted 6 to 9 ml. of urine per twenty-four hours; monkeys at the 30 mg./kg. dose level excreted 36 to 184 ml. (average, 101 ml.) per twenty-four hours; and monkeys at the 60 mg./kg. dose level excreted 92 to 205 ml. (average, 132 ml.) per twenty-four hours.

*Tolerance tests.*—The frequency of emetic action of 2-(4-sulfamylphenylamino)-4-amino-1,3,5-triazine was compared with that of theophylline in dogs. Doses of 7.5 to 120 mg./kg. of each drug suspended in 25 ml. of 0.5 percent aqueous saline-gum tragacanth solution were administered by stomach tube. The results thus obtained are set forth below in Table III.

Table III.—Incidence of emesis after oral administration of 2-(4-sulfamylphenylamino)-4-amino-1,3,5-triazine (Compound I) or anhydrous theophylline

| Compound | Dose mg./kg. | No. of expts. | Number positive/ Number tested | Onset, time in minutes | Percent |
|---|---|---|---|---|---|
| Compound I | 7.5 | 12 | 0/12 | | 0 |
| | 15.0 | 12 | 0/12 | | 0 |
| | 30.0 | 15 | 1/15 | 135 | 6.7 |
| | 60.0 | 12 | 1/12 | 137 | 9.2 |
| | 120.0 | 5 | 1/5 | 130 | 20.0 |
| Theophylline (anhydrous) | 7.5 | 13 | 0/13 | | 0 |
| | 15.0 | 15 | 1/15 | 85 | 6.7 |
| | 30.0 | 34 | 2/34 | 270, 180 | 5.8 |
| | 60.0 | 17 | 4/17 | 70, 140, 90, 70 | 23.5 |
| | 120.0 | 5 | 5/5 | 250, 50, 120, 67, 130 | 100.0 |

The above results showed that 2-(4-sulfamylphenylamino)-4-amino-1,3,5-triazine was much less likely than theophylline to cause emesis. No ill effects other than emesis were observed, although the urine was frequently cloudy.

Tolerance to repeated doses of 2-(4-sulfamylphenylamino)-4-amino-1,3,5-triazine in dogs was studied as follows. In a preliminary test, doses of 10 and 30 mg./kg. of 2-(4-sulfamylphenylamino)-4-amino-1,3,5-triazine were administered by gavage to pairs of beagle hounds of known history. The animals were fed once daily and water was freely available at all times. Single daily doses of drug were administered sixteen times in eighteen days. The treated dogs were normal in appearance and behavior and there were no significant changes in body weight. There were no significant changes in number or morphology of erythrocytes or leucocytes, in the hematocrit or in hemoglobin concentration. Repeated examination of the urine showed no abnormality except a few crystalloid spherulites which were most frequently seen in urine from the dogs on the higher dose; cloudiness occurred irregularly in the urine sample of control as well as medicated dogs and was not related to dosage. There was no evidence of hemorrhage or pus cells. The animals were autopsied and no pathological changes were found; there was no evidence of damage to the excretory system and spherulites were not observed in the kidneys or urinary bladder.

In a chronic test, three groups of three beagle dogs received single doses of 15, 30 and 60 mg./kg. daily except on Sundays for nine months. All doses were well tolerated without evidence of toxicity.

In the above-described tests in rhesus monkeys, it was observed that the 2-(4-sulfamylphenylamino)-4-amino-1,3,5-triazine was completely tolerated, with no change in appearance, behavior, or body weight. There were no hematological changes and repeated microscopic examination of the urine failed to show any abnormality; no spherulites were observed and tests for albuminuria were negative.

*Acute toxicity.*—2-(4-sulfamylphenylamino)-4-amino-1,3,5-triazine was well tolerated by dogs when doses of 10 to 15 mg./kg. were administered intravenously by infusion or rapidly as a microsuspension in saline.

*Acute oral toxicity.*—Acute oral toxicity studies were carried out in mice and in rats. The drug was administered by gavage as a finely divided powder in a twenty percent suspension in 1.0 percent gum tragacanth. Groups of 10 or 20 mice (20 gm.) or rats (100 gm.) received doses of 63.1, 125.0, 250.0, 500.0, 1000.0, 2000.0, 4000.0, and 8000.0 (mice only) mg./kg. The oral $LD_{50}$ for mice was 6,200 mg./kg. at 24 hours and due to erratic delayed deaths the $LD_{50}$ was about 1,120 mg./kg. at 7 days; it was not possible to establish a valid dose-mortality curve for the mouse. The oral $LD_{50}$ for the rat was 3,300±860 mg./kg. at 24 hours and about 1,000.0 mg./kg. at 7 days. Mice were more adversely affected by the doses of 500 mg./kg. or less than by the doses of 1000 mg./kg. or greater, whereas rats were more affected by the higher doses, with a rather flat dose response curve. Gross examination of the viscera on the seventh and eighth days after medication showed no significant change other than paleness and mottling of the cortex of the kidneys; on section the affected kidneys showed the presence of white crystalloid spherules which presumably caused death by occlusion of the tubules, as in the case of similar high doses of sulfonamides. The mortality in mice and rats at the various dose levels is shown in Table IV. It was apparent that there was a marked species difference in response to the drug which was consistently well tolerated by dogs and monkeys whereas mice and rats were relatively much more susceptible than higher mammals.

*Clinical results.*—Tablets weighing 200 mg. each were prepared which contained per tablet: 100 mg. of 2-(4-sulfamylphenylamino)-4-amino-1,3,5-triazine; 78 mg. of a granulated mixture of 49% dicalcium phosphate, 49% powdered lactose, and 2% starch paste; 20 mg. of powdered starch; and 2 mg. of magnesium stearate. Oral administration of these tablets in a dosage varied from one tablet twice a week to 10 tablets 3 times in a day to human patients requiring a diuretic agent. Treatment in this manner has resulted in a beneficial increase of urinary output which advantageously was prolonged and substantially free of untoward side-effects.

*Table IV.—Acute oral toxicity of 2-(4-sulfamylphenylamino)-4-amino-1,3,5-triazine (compound I) for mice and rats*

| Dose, mg./kg. | Mortality | | | |
|---|---|---|---|---|
| | Mouse | | Rat | |
| | 24 hours | 7 days | 24 hours | 7 days |
| 63.1 | 3/20 | 3/20 | 0/10 | 0/10 |
| 125 | 2/20 | 4/20 | 3/10 | 3/10 |
| 250 | 2/20 | 5/20 | 0/10 | 1/10 |
| 500 | 3/30 | 14/30 | 0/10 | 6/10 |
| 1,000 | 2/30 | 8/30 | 2/10 | 8/10 |
| 2,000 | 0/10 | 7/10 | 2/10 | 5/10 |
| 4,000 | 0/10 | 3/10 | 5/10 | 9/10 |
| 8,000 | 1/10 | 4/10 | | |

Oral $LD_{50}$±s. e., mg./kg.:
At 24 hours _____ 6,200   3,300 ±860
At 7 days _____ 1,120   1,000

We claim:

1. A compound of the class consisting of 2-(4-sulfamylphenylamino)-4-amino-1,3,5-triazine and the acid-addition salts thereof.

2. 2-(4-sulfamylphenylamino)-4-amino-1,3,5-triazine.

3. An acid-addition salt of 2-(4-sulfamylphenylamino)-4-amino-1,3,5-triazine.

4. 2-(4-sulfamylphenylamino)-4-amino-1,3,5-triazine hydrochloride.

5. The process which comprises: heating 4-sulfamylphenylbiguanide with an excess of formic acid; and dissociating the resulting 2-(4-sulfamylphenylamino)-4-amino-1,3,5-triazine formate to generate 2-(4-sulfamylphenylamino)-4-amino-1,3,5-triazine.

References Cited in the file of this patent

UNITED STATES PATENTS 2,312,698   D'Alelio _____ Mar. 2, 1943

FOREIGN PATENTS 168,063   Austria _____ Apr. 10, 1951